L. C. CLARK.
Improvement in Whip Socket.
No. 123,769.                           Patented Feb. 20, 1872.
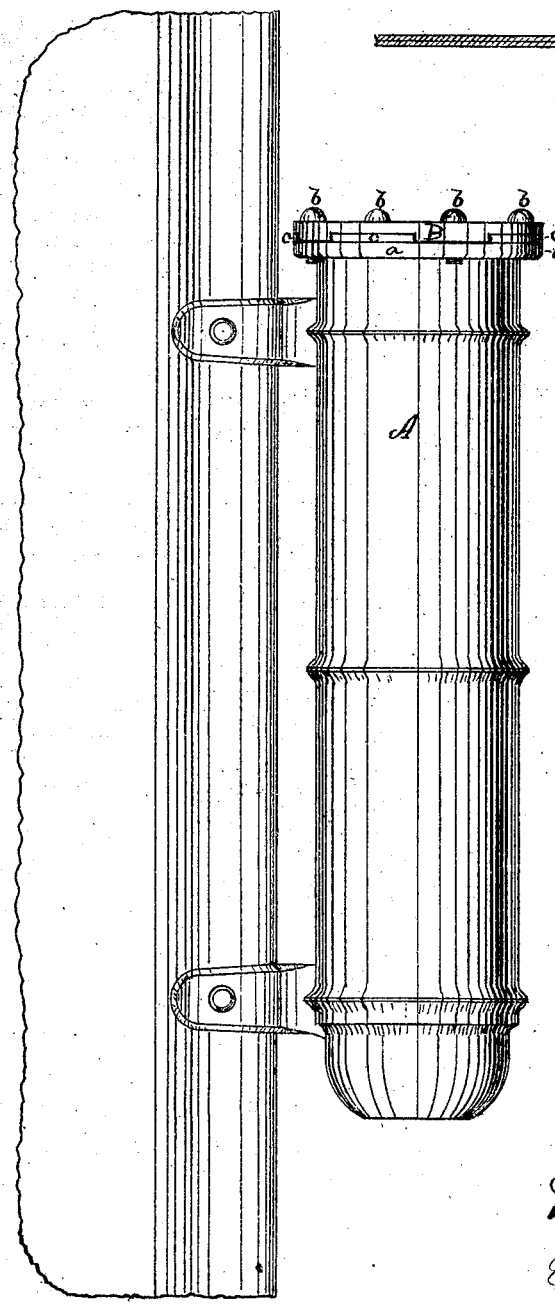
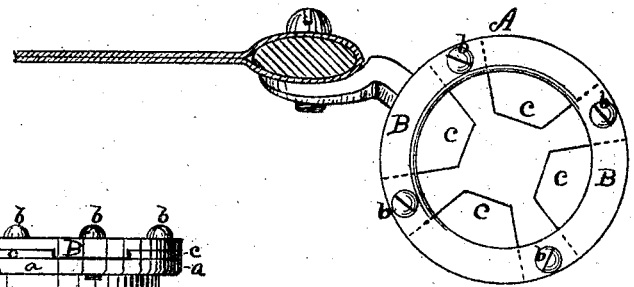
Inventor.
Lucas. C. Clark,
By James Shepard Atty.
Witnesses.
H. B. Dodge
C. A. Shepard No. 123,769

UNITED STATES PATENT OFFICE.

LUCAS C. CLARK, OF PLANTSVILLE, CONNECTICUT.

IMPROVEMENT IN WHIP-SOCKETS.

Specification forming part of Letters Patent No. 123,769, dated February 20, 1872; antedated February 5, 1872.

I, LUCAS C. CLARK, of Plantsville, in the county of Hartford and State of Connecticut, have invented certain new and useful Improvements in Whip-Sockets, of which the following is a specification:

My invention consists in the employment of independent rubber arms or projections, extending from the rim of the socket inward over its mouth, as hereafter described, and in the improved attachment for securing said arms to the socket.

In the accompanying drawing, Figure 1 is a side elevation of a whip-socket embodying my invention; Fig. 2, a top view of the same; and Fig. 3, a plan view of the rubber arms.

A designates a whip-socket, which may be made of any material and of any desired design. The mouth of the socket A is provided with a rim, $a$, to which rim is secured, by screws $b$, or other suitable fastening, the cap B. Two or more arms, $c$ $c$, of rubber, leather, or suitable soft and elastic material, are placed with one end under the cap B, and the other extending directly inward, partially across the mouth of the socket A, and are secured in place by compression between the cap B and rim $a$. The arms $c$ $c$ are independent and made in separate pieces, in order to effect a great saving in material, and that one of their ends may rest in the slots in the rim $a$, so that the screws $b$ shall pass between them; and that, by simply loosening the screws, one or all of the arms $c$ $c$ can be removed and replaced by new ones.

The manner of securing the arms to the socket is immaterial to the first part of my invention.

The advantages of my invention over the rubber washer or collar now in common use are that the device can be made from a smaller amount of stock, and consequently at a less price; that the cushion, being in sections instead of solid, will allow the whip to pass through it with greater ease and less wear of the rubber; that thicker rubber may be used and still allow the whip to be easily inserted; that the form of the arms is such that leather may be used as a substitute for rubber, which it would be impossible to do with a solid collar; that, by simply loosening the cap, one or all of the arms may be removed and replaced by new ones, when desired, thus always insuring a perfect protection of the whip.

I claim as my invention—

1. The independent arms $c$ $c$, constructed of separate pieces and arranged on the rim of a whip-socket, as and for the purpose described.

2. The removable cap B and its screws $b$, in combination with the cushions or arms $c$ $c$, rim $a$, and socket A, all substantially as and for the purpose described.

LUCAS C. CLARK.

Witnesses:
JAMES SHEPARD,
C. A. SHEPARD.